US012428906B1

(12) United States Patent
Lu

(10) Patent No.: US 12,428,906 B1
(45) Date of Patent: Sep. 30, 2025

(54) SELF-STOPPING ROLLER BLIND MECHANISM WITH SPRING INTEGRATED IN ROLLER SHAFT AND HAND-HELD CURTAIN

(71) Applicant: Ningbo Zhenfei Decorated Curtain Co., Ltd., Zhejiang (CN)

(72) Inventor: Jiefei Lu, Zhejiang (CN)

(73) Assignee: Ningbo Zhenfei Decorated Curtain Co., Ltd., Yuyao (CN)

( * ) Notice: Subject to any disclaimer, the term of this patent is extended or adjusted under 35 U.S.C. 154(b) by 0 days.

(21) Appl. No.: 19/083,457

(22) Filed: Mar. 19, 2025

(30) Foreign Application Priority Data

Oct. 9, 2024 (CN) ......................... 202422426148.3

(51) Int. Cl.
*E06B 9/60* (2006.01)
*E06B 9/42* (2006.01)

(52) U.S. Cl.
CPC . *E06B 9/60* (2013.01); *E06B 9/42* (2013.01)

(58) Field of Classification Search
CPC ................ E06B 9/60; E06B 9/42; A47H 1/13
See application file for complete search history.

(56) References Cited

U.S. PATENT DOCUMENTS

| | | | | |
|---|---|---|---|---|
| 9,284,774 | B2 * | 3/2016 | Yu | E06B 9/322 |
| 2012/0267060 | A1 * | 10/2012 | Anderson | E06B 9/262 160/307 |
| 2013/0025803 | A1 * | 1/2013 | Eiterman | G01M 99/008 73/865.9 |
| 2016/0130866 | A1 * | 5/2016 | Buccola, Jr. | E06B 9/34 185/9 |

FOREIGN PATENT DOCUMENTS

| | | |
|---|---|---|
| CN | 209011739 U | 6/2019 |
| CN | 211623262 U | 10/2020 |
| CN | 216517737 U | 5/2022 |
| CN | 218150696 U | 12/2022 |

* cited by examiner

*Primary Examiner* — Beth A Stephan

(57) ABSTRACT

The disclosure relates to the field of curtain technology and discloses a self-stopping roller blind mechanism with spring integrated in roller shaft and a hand-held curtain. The self-stopping roller blind mechanism with spring integrated in roller shaft includes a mounting bracket, a winding device, and a roller shaft connected to the winding device. The winding device includes a rotating assembly and a spring assembly. The rotating assembly includes a fixed part connected to the mounting bracket and a rotating part that can rotate along its own circumference. The rotating part rotates synchronously with the roller shaft. When the rotating part rotates, it has a first direction that raises the curtain fabric and a second direction that lowers the curtain fabric. The spring assembly is connected to the rotating part and rotates synchronously, and the spring assembly is placed inside the roller shaft.

18 Claims, 10 Drawing Sheets

SELF-STOPPING ROLLER BLIND MECHANISM WITH SPRING INTEGRATED IN ROLLER SHAFT AND HAND-HELD CURTAIN

CROSS REFERENCE TO RELATED APPLICATIONS

The present application claims the benefit of Chinese Patent Application No. 202422426148.3 filed on Oct. 9, 2024, the contents of which are incorporated herein by reference in their entirety.

TECHNICAL FIELD

The present disclosure relates to the field of curtain technology, specifically to a self-stopping roller blind mechanism with spring integrated in roller shaft and a hand-held curtain.

BACKGROUND ART

Existing spring roller blinds generally include brackets on both sides and a roller shaft, with a spring rod set inside the roller shaft. A limiting spring is fitted over the spring rod, and a spring end plug is installed at the end of the limiting spring. The recoil force of the limiting spring needs to be pre-wound according to the size and weight of the curtain. In the Chinese patent application number 201821249939.1, a hand-held zebra blind was disclosed, which has the following issues: The hand-held zebra blind includes a fabric roller shaft and a winding device. The spring strip, spring fixing disc, and spring winding disc of the winding device are all set inside the bracket housing (the bracket housing is formed by interlocking the outer shell and end cap), which leads to a thicker horizontal dimension of the bracket housing. This results in a larger gap between the side surface of the bracket housing away from the fabric and the fabric itself, causing serious light leakage issues in the gap area and poor user experience. Moreover, the bracket housing used for installation is formed by interlocking the outer shell and end cap, making the structure more complex and increasing production costs.

SUMMARY OF THE DISCLOSURE

To solve at least one aspect of the above problems, this disclosure provides a self-stopping roller blind mechanism with spring integrated in roller shaft, including: a mounting bracket, a winding device, and a roller shaft connected to the winding device. The roller shaft is used to connect the curtain fabric, and the winding device is used to wind the roller shaft. The winding device includes a rotating assembly and a spring assembly. The rotating assembly includes a fixed part connected to the mounting bracket and a rotating part that can rotate along its own circumference. The rotating part rotates synchronously with the roller shaft. When the rotating part rotates, it has a first direction that raises the curtain fabric and a second direction that lowers the curtain fabric. The spring assembly is connected to the rotating part and rotates synchronously, and the spring assembly is placed inside the roller shaft. When the rotating part rotates in the second direction, the spring assembly stores potential energy. By releasing the stored potential energy of the spring assembly, it drives the spring assembly, the rotating part, and the roller shaft to rotate and reset in the first direction, thus raising and winding up the curtain fabric. This disclosure places the spring assembly inside the roller shaft, greatly reducing the thickness of the mounting bracket, narrowing the gap between the side surface of the mounting bracket and the curtain fabric, reducing light leakage, and simplifying the structure of the mounting bracket, thereby lowering production costs.

Optionally, the rotating part includes an outer shell body, and the outer shell body includes a plunger main body, with the plunger main body placed inside the roller shaft.

Optionally, the rotating assembly also includes a first output shaft, which is eccentrically set on the side of the outer shell body close to the spring assembly. The first output shaft is used to connect and drive the spring assembly to store energy, and the rotation of the rotating part drives the first output shaft to rotate.

Optionally, a transmission component is set between the first output shaft and the fixed part. When the rotating part rotates relative to the fixed part, it drives the first output shaft to rotate through the transmission component.

Optionally, the transmission component includes a first connecting block, a second connecting block, and an intermediate movable block set inside the outer shell body. The first connecting block is connected to the fixed part, the second connecting block is set at the end of the first output shaft away from the spring assembly, and the intermediate movable block is movably connected between the first connecting block and the second connecting block. The first connecting block has a first protrusion, the second connecting block has a second protrusion, and the intermediate movable block has a first sliding groove that slides with the first protrusion and a second sliding groove that slides with the second protrusion. The extension direction of the first sliding groove and the extension direction of the second sliding groove are perpendicular to each other.

Optionally, a first protruding strip is set in the first sliding groove, extending along the extension direction of the first sliding groove. The first protrusion has a third sliding groove that slides and engages with the first protruding strip, extending along the extension direction of the first protrusion. A second protruding strip is set in the second sliding groove, extending along the extension direction of the second sliding groove. The second protrusion has a fourth sliding groove that slides and engages with the second protruding strip, extending along the extension direction of the second protrusion.

Optionally, a first ball is set between the first protruding strip and the third sliding groove, and a second ball is set between the second protruding strip and the fourth sliding groove.

Optionally, a first rib is set on the first protrusion, which contacts the inner wall of the first sliding groove.

Optionally, the first rib extends along the extension direction of the first protrusion, there are multiple first ribs, and the first ribs are symmetrically distributed on both sides of the first protrusion.

Optionally, the first rib is in the shape of an arched protrusion.

Optionally, a second rib is set on the second protrusion, which contacts the inner wall of the second sliding groove.

Optionally, the second rib extends along the extension direction of the second protrusion, there are multiple second ribs, and the second ribs are symmetrically distributed on both sides of the second protrusion.

Optionally, the second rib is in the shape of an arched protrusion.

Optionally, the spring assembly includes a shell, one end of the shell has an input shaft hole for storing energy in the spring assembly, the input shaft hole matches the first output shaft, the spring assembly also includes a coiled spring and a rotating spring shaft set inside the shell, the coiled end of the coiled spring is connected to the rotating spring shaft, and the input shaft hole is set at one end of the rotating spring shaft.

Optionally, the fixed part includes a fixed sleeve, a manual adjustment dial, and a fixed column. The manual adjustment dial includes a disc body and an annular column body. The fixed column is placed inside the annular column body, and a clamping spring is set between the fixed column and the annular column body. A first locking block is set on the mounting bracket, and a first locking groove for engaging with the first locking block is set on the side of the fixed column. The annular column body is placed inside the fixed sleeve, a second locking block is set inside the fixed sleeve, and a notch corresponding to the second locking block is set on the annular column body. The fixed sleeve, annular column body, clamping spring, and fixed column are all placed inside the outer shell body, and the outer shell body engages with the spring assembly.

Optionally, the fixed part includes a fixed shaft, a first locking block is set on the mounting bracket, a second locking groove for engaging with the first locking block is set on the side of the fixed shaft, a removable locking pin is inserted into the outer shell body, multiple third locking grooves corresponding to the locking pin are set around the fixed shaft, and one end of the locking pin passes through the outer shell body and locks into one of the third locking grooves for positioning.

Optionally, the mounting bracket is in the form of a plate-like body, one or more spring assemblies are set along the axial direction, when there are multiple spring assemblies, adjacent spring assemblies engage with each other, both ends of the spring assembly are set with matching input shaft holes and second output shafts, and between adjacent spring assemblies, the second output shaft of one spring assembly is inserted into and rotates synchronously with the input shaft hole of the other spring assembly.

Compared to the prior art, this disclosure's self-stopping roller blind mechanism with spring integrated in roller shaft places the spring assembly inside the roller shaft, greatly reducing the thickness of the mounting bracket, narrowing the gap between the side surface of the mounting bracket and the curtain fabric, reducing light leakage, and simplifying the structure of the mounting bracket, thereby lowering production costs. The rotating part includes an outer shell body, which includes a plunger main body placed inside the roller shaft, resulting in a compact structure and hidden design within the roller shaft, avoiding increased gaps between the curtain fabric and mounting bracket. In the structure with a manual adjustment dial, users or installers can manually pre-tighten the spring assembly through the dial, with adjustable tightening levels, preventing waste of the spring assembly's winding capacity. In the structure with a locking pin, the spring assembly can be pre-tightened before leaving the factory, with this tightened force locked by the pin. Users or installers only need to remove the pin to utilize this pre-tightened force during installation, eliminating the need for re-tightening and making installation more convenient. The number of spring assemblies can be set according to the matching of different coiled spring recoil forces with the required recoil forces of different curtains, allowing for more flexible use.

This disclosure also provides a hand-held curtain that includes the aforementioned self-stopping roller blind mechanism with spring integrated in roller shaft. This hand-held curtain shares the same beneficial effects as the self-stopping roller blind mechanism with spring integrated in roller shaft mentioned above, which will not be repeated here.

Figure 1:
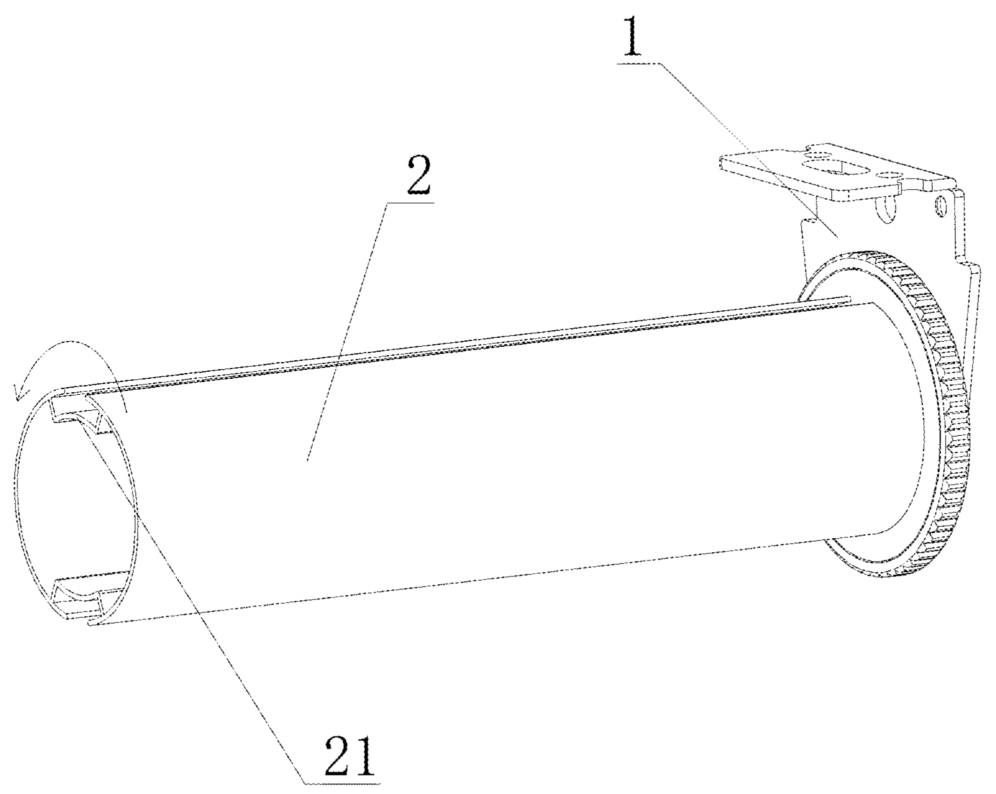
FIG. 1 is a perspective view of the self-stopping roller blind mechanism with spring integrated in roller shaft of this disclosure.

List of reference numerals: 1—mounting bracket, 101—first locking block, 2—roller shaft, 21—limiting protrusion, 3—rotating part, 31—outer shell body, 311—plunger main body, 312—limiting groove, 4—spring assembly, 40—second output shaft, 41—shell, 411—input shaft hole, 42—coiled spring, 43—rotating spring shaft, 5—fixed part, 51—fixed sleeve, 511—second locking block, 52—manual adjustment dial, 521—disc body, 522—annular column body, 5221—notch, 53—fixed column, 531—first locking groove, 54—clamping spring, 55—fixed shaft, 551—second locking groove, 552—third locking groove, 56—square insertion hole, 6—first output shaft, 61—first connecting block, 611 first protrusion, 6111—third sliding groove, 6112—first rib, 612—square insertion shaft, 62—second connecting block, 621—second protrusion, 6211—fourth sliding groove, 6212—second rib, 63—intermediate movable block, 631—first sliding groove, 6311—first protruding strip, 632—second sliding groove, 6321—second protruding strip, 7—locking pin, 81—snap-fit part, 82—fourth locking groove, 9—curtain fabric, 10—first ball, 11—second ball, L-gap.

DETAILED DESCRIPTION OF EMBODIMENTS

To make the above-mentioned objectives, features, and advantages of this disclosure more apparent and easier to understand, the specific embodiments of this disclosure will be described in detail with reference to the accompanying drawings.

In the description of this disclosure, it should be understood that terms such as "upper" and "lower" indicate orientations or positional relationships based on the normal use of the product.

The terms "first" and "second" are used for descriptive purposes only and should not be understood as indicating or implying relative importance or implicitly specifying the number of technical features indicated. Thus, features defined as "first" and "second" may explicitly or implicitly include at least one such feature.

Embodiment 1

Referring to FIGS. 1-11, Embodiment 1 of this disclosure provides a self-stopping roller blind mechanism with spring integrated in roller shaft, including: a mounting bracket 1, a winding device, and a roller shaft 2 connected to the winding device. The roller shaft 2 is used to connect the curtain fabric, and the winding device is used to wind the roller shaft 2. The winding device includes a rotating assembly and a spring assembly 4. The rotating assembly includes a fixed part 5 connected to the mounting bracket 1 and a rotating part 3 that can rotate along its own circumference. The rotating part 3 rotates synchronously with the roller shaft 2. When the rotating part 3 rotates, it has a first direction that raises the curtain fabric and a second direction that lowers the curtain fabric. The first direction and the second direction are opposite. The spring assembly 4 is connected to the rotating part 3 and rotates synchronously, and the spring assembly 4 is placed inside the roller shaft 2. When the rotating part 3 rotates in the second direction (as shown by the arrow in FIG. 1), the spring assembly 4 stores potential energy. By releasing the stored potential energy of the spring assembly 4, it drives the spring assembly 4, the rotating part 3, and the roller shaft 2 to rotate and reset in the first direction, thus raising and winding up the curtain fabric. This disclosure places the spring assembly inside the roller shaft, greatly reducing the thickness of the mounting bracket, narrowing the gap L between the side surface of the mounting bracket away from the curtain fabric 9 and the curtain fabric 9 itself, reducing light leakage, and simplifying the structure of the mounting bracket, thereby lowering production costs.

Referring to FIGS. 1-4, the rotating part 3 includes an outer shell body 31, and the outer shell body 31 includes a plunger main body 311, with the plunger main body 311 placed inside the roller shaft 2, resulting in a compact structure and hidden design within the roller shaft 2, avoiding increased gaps between the curtain fabric and mounting bracket. A limiting groove 312 is set on the outer shell body 31, and a limiting protrusion 21 corresponding to and engaging with the limiting groove 312 is set on the inner side of the roller shaft 2, allowing the outer shell body 31 to rotate synchronously with the roller shaft 2. The rotating assembly also includes a first output shaft 6, which is eccentrically set on the side of the outer shell body 31 close to the spring assembly 4. The first output shaft 6 is used to connect and drive the spring assembly 4 to store energy. The rotation of the rotating part 3 drives the first output shaft 6 to rotate, thereby storing energy in the spring assembly 4 through the rotation of the rotating part 3. When the spring assembly 4 releases potential energy, it can drive the rotating part 3 to rotate and reset.

Referring to FIGS. 1, 2, 3, 4, and 6, a transmission component is set between the first output shaft 6 and the fixed part 5. When the rotating part 3 rotates relative to the fixed part 5, it drives the first output shaft 6 to rotate through the transmission component. The winding device needs to be pre-tightened before installation (or before leaving the factory), which means rotating the rotating part 3 relative to the fixed part 5 for a certain number of turns to ensure the curtain fabric can be fully rolled up. The specific number of turns is determined based on parameters such as curtain size and weight. The transmission component includes a first connecting block 61, a second connecting block 62, and an intermediate movable block 63 set inside the outer shell body 31. The first connecting block 61 is connected to the fixed part 5, and the first connecting block 61 has a square insertion shaft 612. The fixed part 5 has a square insertion hole 56 corresponding to and engaging with the square insertion shaft 612. The second connecting block 62 is set at the end of the first output shaft 6 away from the spring assembly 4, and the intermediate movable block 63 is movably connected between the first connecting block 61 and the second connecting block 62. The first connecting block 61 has a first protrusion 611, the second connecting block 62 has a second protrusion 621, and the intermediate movable block 63 has a first sliding groove 631 that slides with the first protrusion 611 and a second sliding groove 632 that slides with the second protrusion 621. The extension direction of the first sliding groove 631 and the extension direction of the second sliding groove 632 are perpendicular to each other. The first connecting block 61 and the second connecting block 62 transmit motion through the intermediate movable block 63, so that when one of the first connecting block 61 and the second connecting block 62 rotates along its own circumference, it drives the other connecting block to rotate along its own circumference. Conversely, when one does not rotate along its own circumference, the other connecting block will not rotate along its own circumference either. This ensures that: after the winding device is installed on the mounting bracket, neither the first connecting block 61 nor the second connecting block 62 rotates along its own circumference, and when the rotating part 3 rotates, the second connecting block 62 rotates along the circumferential direction of the outer shell body 31 without rotating along its own circumference.

Referring to FIGS. 6, 9, 10, and 11, a first protruding strip 6311 is set in the first sliding groove 631, extending along the extension direction of the first sliding groove 631. The first protrusion 611 has a third sliding groove 6111 that slides and engages with the first protruding strip 6311, extending along the extension direction of the first protrusion 611. A second protruding strip 6321 is set in the second sliding groove 632, extending along the extension direction of the second sliding groove 632. The second protrusion 621 has a fourth sliding groove 6211 that slides and engages with the second protruding strip 6321, extending along the extension direction of the second protrusion 621. A first ball 10 is set between the first protruding strip 6311 and the third sliding groove 6111, and a second ball 11 is set between the second protruding strip 6321 and the fourth sliding groove 6211. The first ball 10 and the second ball 11 reduce friction between the sliding parts, making the movement smoother.

Referring to FIGS. 6, 9, 10, and 11, a first protruding strip 6311 is set in the first sliding groove 631, extending along the extension direction of the first sliding groove 631. The first protrusion 611 has a third sliding groove 6111 that slides and engages with the first protruding strip 6311, extending along the extension direction of the first protrusion 611. The first protruding strip 6311 and the third sliding groove 6111 serve as sliding guides, making the sliding of the first protrusion 611 more stable. A second protruding strip 6321 is set in the second sliding groove 632, extending along the extension direction of the second sliding groove 632. The second protrusion 621 has a fourth sliding groove 6211 that slides and engages with the second protruding strip 6321, extending along the extension direction of the second protrusion 621. The second protruding strip 6321 and the fourth sliding groove 6211 serve as sliding guides, making the sliding of the second protrusion 621 more stable. A first ball 10 is set between the first protruding strip 6311 and the third sliding groove 6111, with installation grooves for rolling installation of the first ball 10 set on the groove walls of the first protruding strip 6311 and the third sliding groove 6111. Multiple first balls 10 are arranged along the extension direction of the first protruding strip 6311. A second ball 11 is set between the second protruding strip 6321 and the fourth sliding groove 6211, with installation grooves for rolling installation of the second ball 11 set on the groove walls of the second protruding strip 6321 and the fourth sliding groove 6211. Multiple second balls 11 are arranged along the extension direction of the second protruding strip 6321. The use of balls makes the sliding smoother and less likely to jam. A first rib 6112 is set on the first protrusion 611, which contacts the inner wall of the first sliding groove 631. The first rib 6112 extends along the extension direction of the first protrusion 611, there are multiple first ribs 6112, and the first ribs 6112 are symmetrically distributed on both sides of the first protrusion 611. The first rib 6112 is in the shape of an arched protrusion, which reduces the contact area between the first protrusion 611 and the inner wall of the first sliding groove 631 during sliding, thereby reducing friction and making the sliding smoother. To enhance structural strength, the intermediate movable block 63 can optionally be made of metal to prevent deformation. A second rib 6212 is set on the second protrusion 621, which contacts the inner wall of the second sliding groove 632. The second rib 6212 extends along the extension direction of the second protrusion 621, there are multiple second ribs 6212, and the second ribs 6212 are symmetrically distributed on both sides of the second protrusion 621. The second rib 6212 is in the shape of an arched protrusion, which reduces the contact area between the second protrusion 621 and the inner wall of the second sliding groove 632 during sliding, thereby reducing friction and making the sliding smoother.

Figure 2:
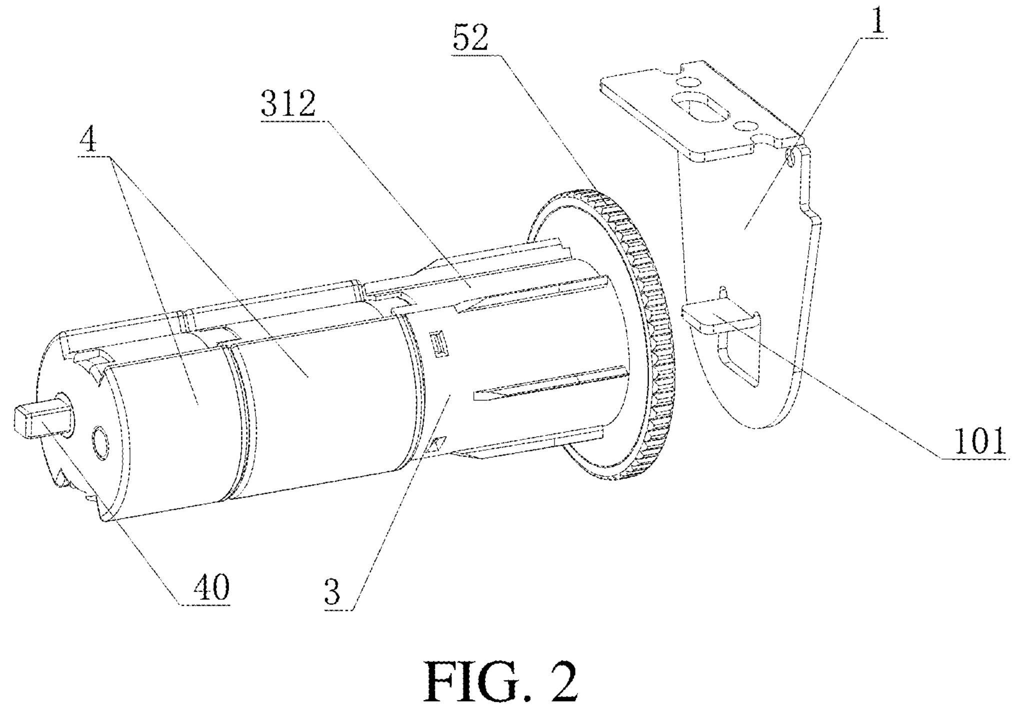
FIG. 2 is a structural diagram of the self-stopping roller blind mechanism with spring integrated in roller shaft of this disclosure.
Figure 3:
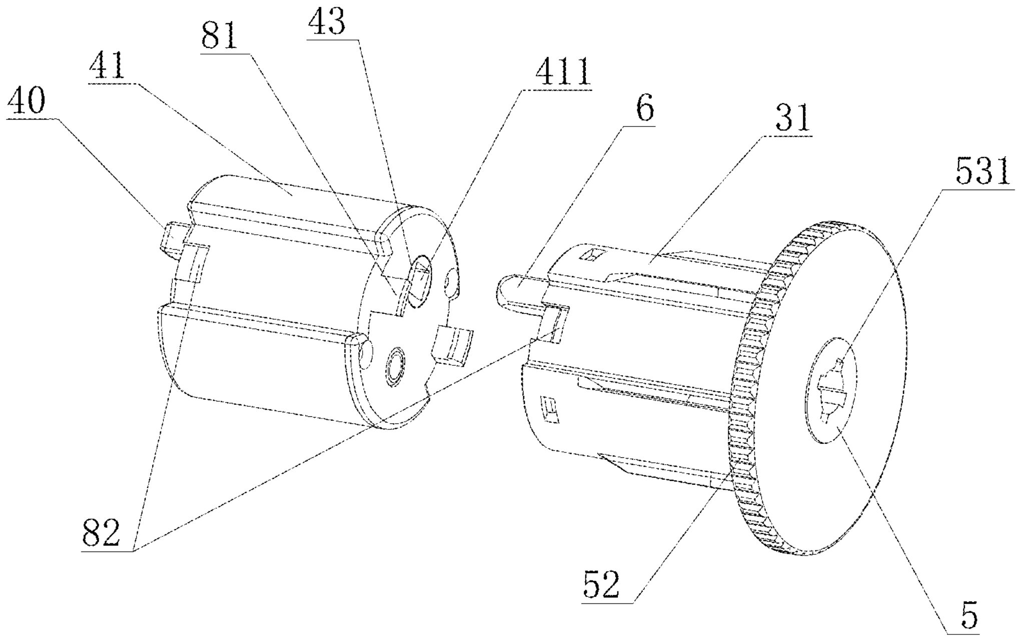
FIG. 3 is a structural diagram of the rotating assembly and spring assembly of the self-stopping roller blind mechanism with spring integrated in roller shaft of this disclosure when disassembled.
Figure 4:
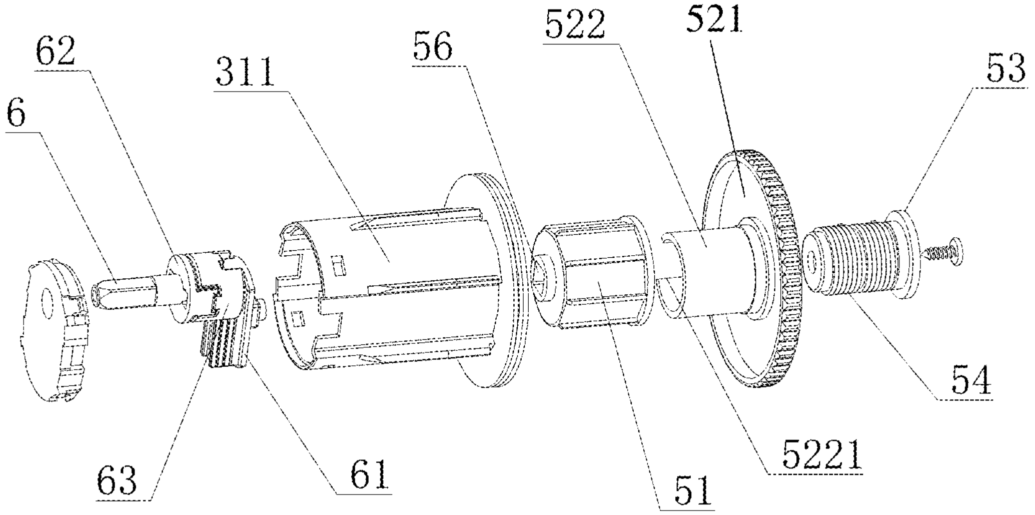
FIG. 4 is an exploded view of the rotating assembly part of the self-stopping roller blind mechanism with spring integrated in roller shaft of this disclosure.
Figure 5:
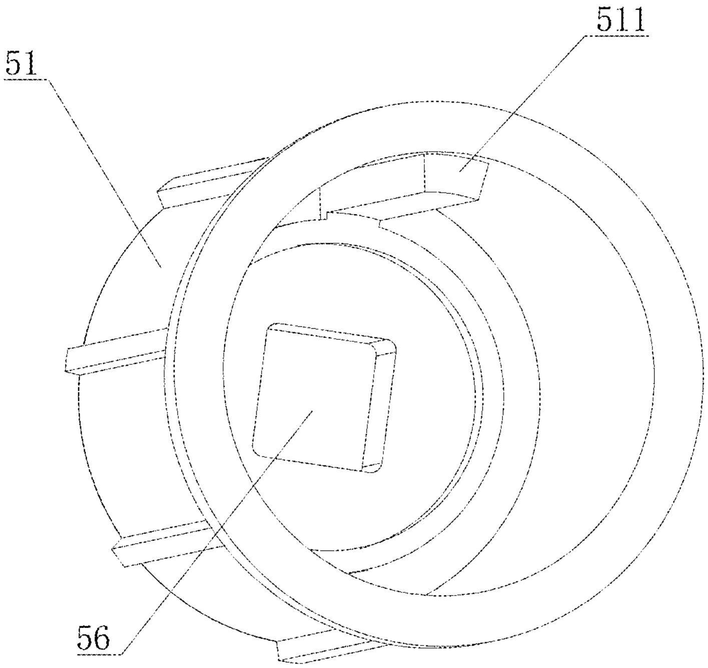
FIG. 5 is a structural diagram of the fixed sleeve of the self-stopping roller blind mechanism with spring integrated in roller shaft of this disclosure.
Figure 6:
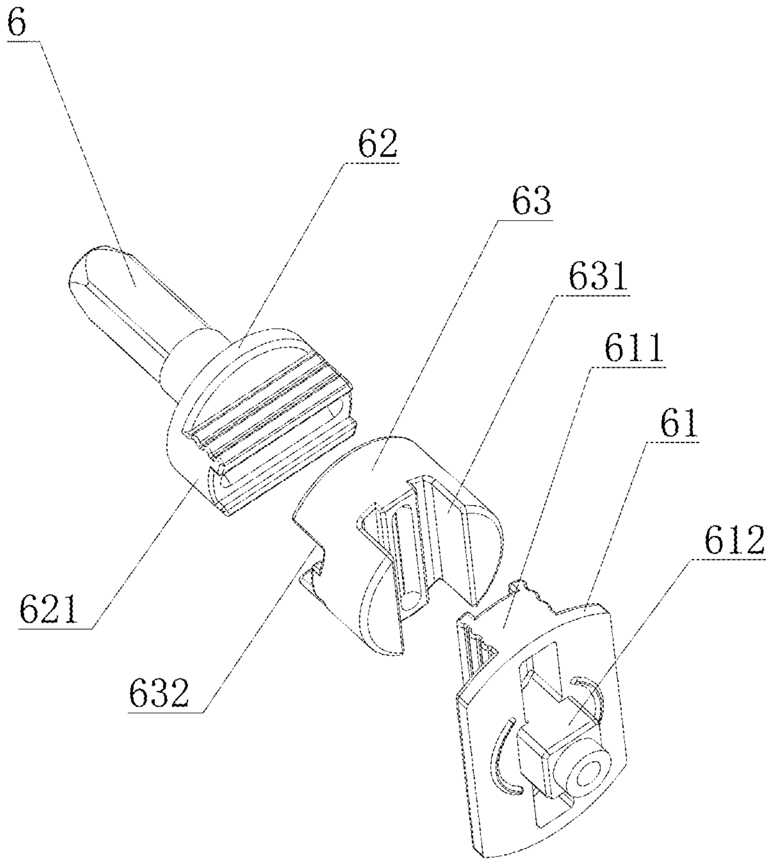
FIG. 6 is an exploded view of the transmission component of the self-stopping roller blind mechanism with spring integrated in roller shaft of this disclosure.
Figure 7:
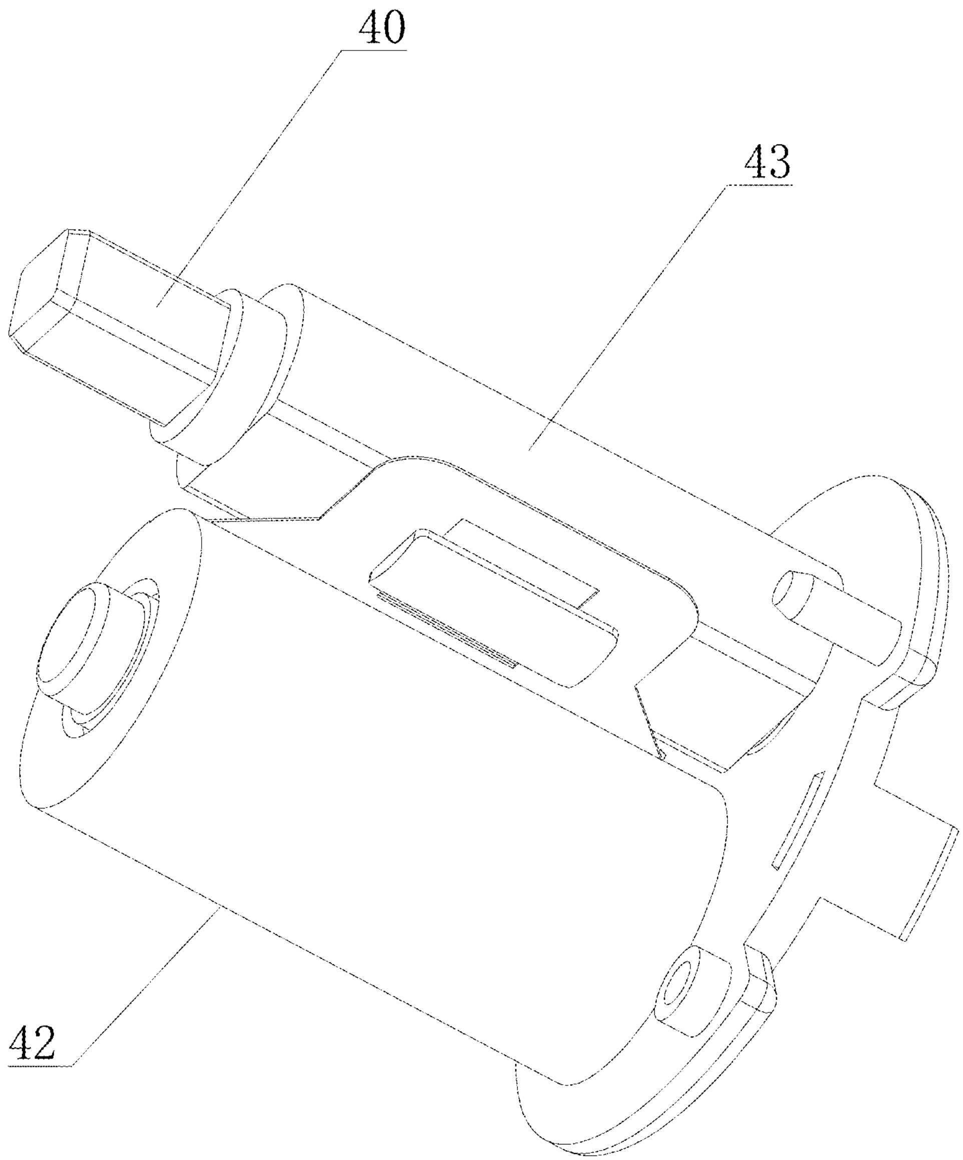
FIG. 7 is a structural diagram of the spring assembly of the self-stopping roller blind mechanism with spring integrated in roller shaft of this disclosure.
Figure 8:
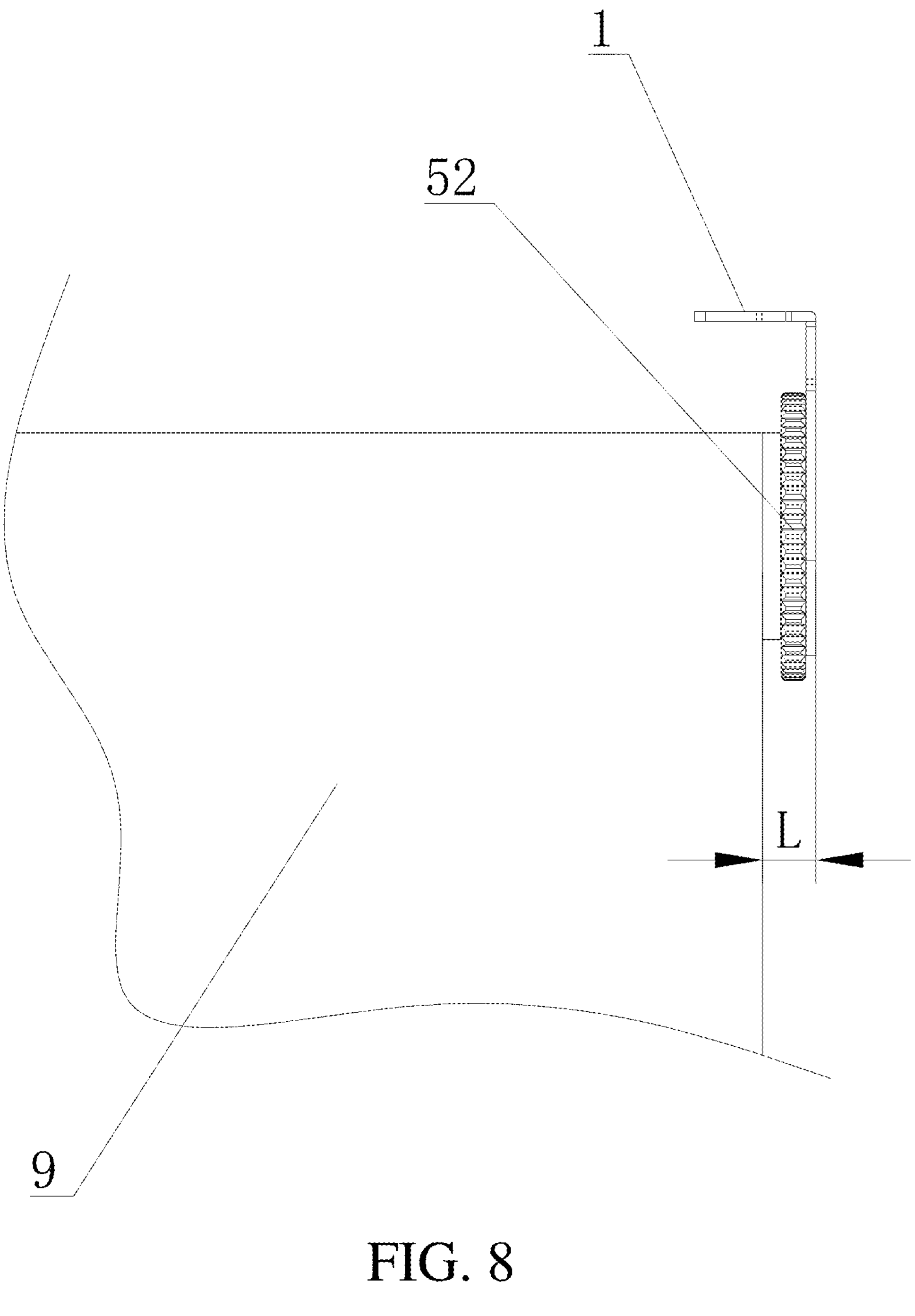
FIG. 8 is a structural diagram of the gap in the self-stopping roller blind mechanism with spring integrated in roller shaft of this disclosure.
Figure 9:
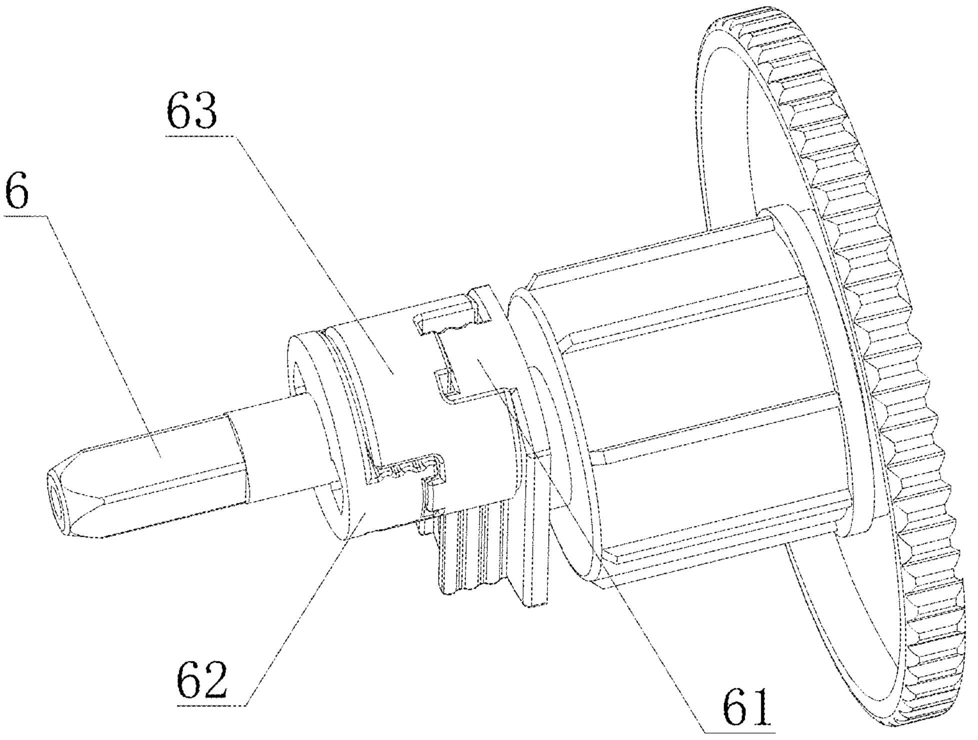
FIG. 9 is a perspective view of the transmission component of the self-stopping roller blind mechanism with spring integrated in roller shaft of this disclosure.
Figure 10:
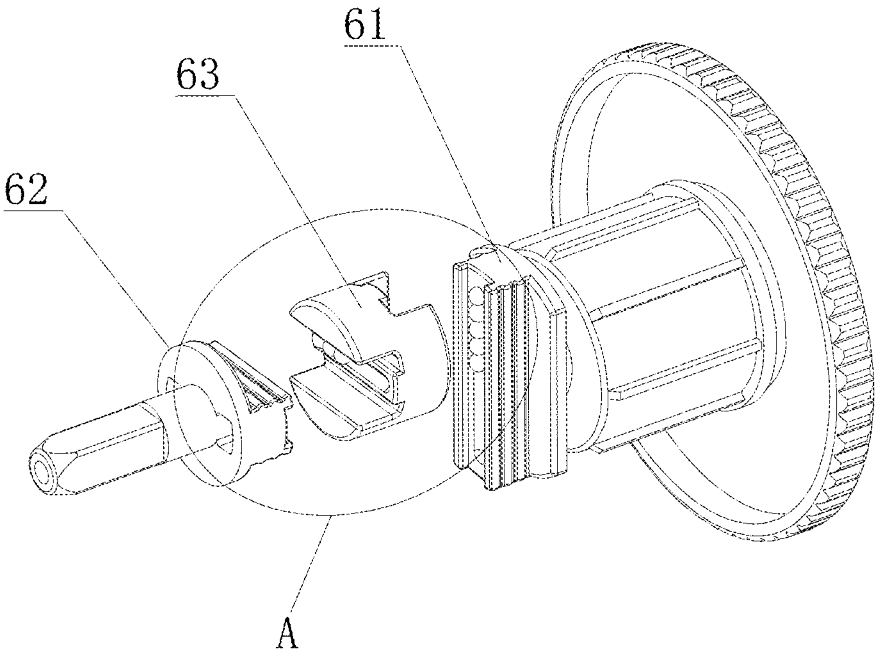
FIG. 10 is an exploded view of the transmission component of the self-stopping roller blind mechanism with spring integrated in roller shaft of this disclosure.
Figure 11:
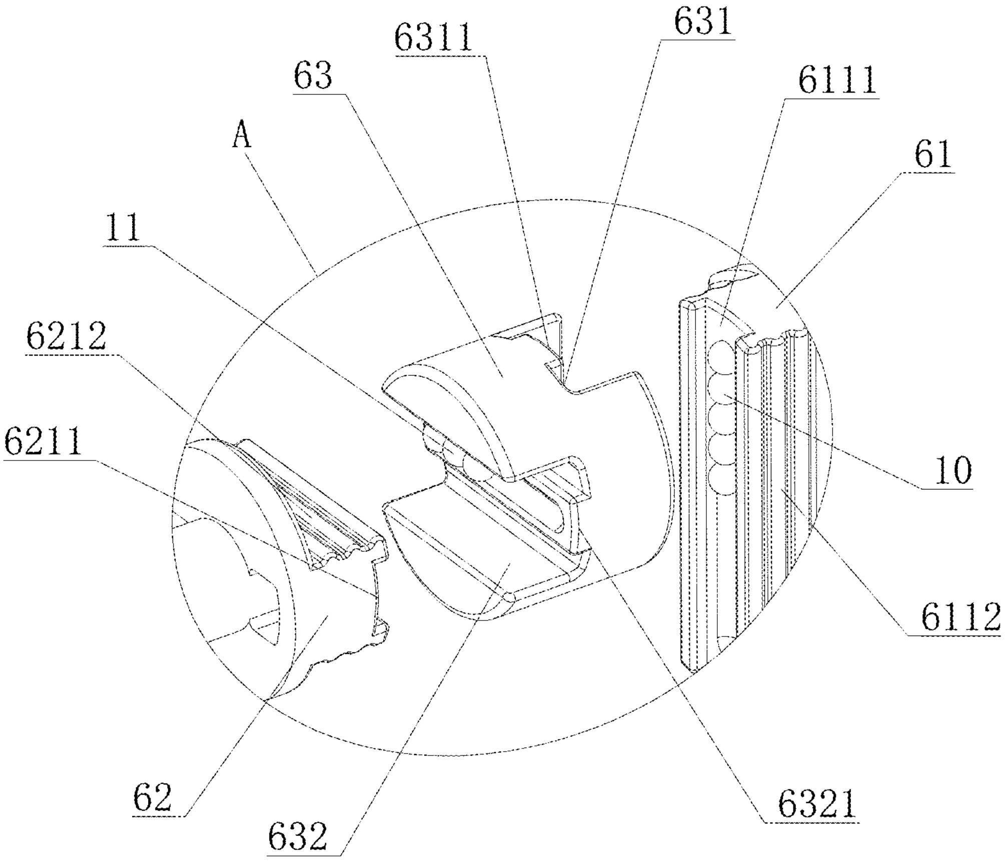
FIG. 11 is an enlarged view of part A in FIG. 10.

Referring to FIGS. 2, 3, and 7, the spring assembly 4 includes a shell 41, one end of the shell 41 has an input shaft hole 411 for storing energy in the spring assembly 4, the input shaft hole 411 matches the first output shaft 6, the first output shaft 6 is a square shaft, and the input shaft hole 411 is a square hole; the spring assembly 4 also includes a coiled spring 42 and a rotating spring shaft 43 set inside the shell 41, the coiled end of the coiled spring 42 is connected to the rotating spring shaft 43, and the input shaft hole 411 is set at one end of the rotating spring shaft 43; when the rotating part 3 rotates in the second direction, it drives the rotating spring shaft 43 to rotate through the first output shaft 6, thus pulling out part of the coiled spring 42 to store potential energy in the spring assembly 4; when the spring assembly 4 releases potential energy, the rotating part 3, first output shaft 6, rotating spring shaft 43, and coiled spring 42 reset; during use, a weight block can be installed on the bottom rail of the curtain fabric to increase the weight, when the curtain fabric is manually suspended, the weight of the curtain fabric balances with the recoil force of the spring assembly 4; when pushing the curtain fabric upwards, due to the loss of balance, the recoil force of the spring assembly 4 becomes greater than the weight of the curtain fabric, at this time, the release of potential energy achieves the function of raising the curtain fabric; during use, pulling the bottom rail of the curtain fabric allows for stopping at any position.

Referring to FIGS. 2-5, the fixed part 5 includes a fixed sleeve 51, a manual adjustment dial 52, and a fixed column 53. The manual adjustment dial 52 includes a disc body 521 and an annular column body 522. The fixed column 53 is placed inside the annular column body 522, and a clamping spring 54 is set between the fixed column 53 and the annular column body 522, ensuring a tight fit between the fixed column 53 and the annular column body 522. There are two clamping springs 54 to ensure sufficient clamping force. A first locking block 101 is set on the mounting bracket 1 by bending, and a first locking groove 531 for engaging with the first locking block 101 is set on the side of the fixed column 53. The annular column body 522 is placed inside the fixed sleeve 51, a second locking block 511 is set inside the fixed sleeve 51, and a notch 5221 corresponding to the second locking block 511 is set on the annular column body 522, limiting the relative rotation between the annular column body 522 and the fixed sleeve 51. The fixed sleeve 51, annular column body 522, clamping spring 54, and fixed column 53 are all placed inside the outer shell body 31, resulting in a compact structure. The outer shell body 31 engages with the spring assembly 4 through a snap-fit structure, making assembly convenient. The snap-fit structure includes a snap-fit part 81 and a fourth locking groove 82 that corresponds to and engages with the snap-fit part 81. The fourth locking groove 82 is set on the outer shell body 31, the snap-fit part 81 is set on the end of the spring assembly 4 close to the outer shell body 31, and the fourth locking groove 82 is set on the end of the spring assembly 4 away from the outer shell body 31. The fourth locking groove 82 on the spring assembly 4 is the same size and structure as the fourth locking groove 82 on the outer shell body 31. The fourth locking groove 82 on the spring assembly 4 can also engage with the snap-fit part 81 of another spring assembly 4, allowing multiple spring assemblies 4 to be connected to increase the recoil torque. Users or installers can manually pre-tighten the spring assembly through the manual adjustment dial 52, with adjustable tightening levels, preventing waste of the spring assembly's winding capacity.

Referring to FIGS. 1, 2, 3, and 7, the mounting bracket 1 is in the form of a plate-like body with a small thickness, which helps reduce light leakage. The mounting bracket 1 is made of a bent metal sheet, resulting in a simple structure and low production cost. One or more spring assemblies 4 are set along the axial direction. When there are multiple spring assemblies 4, adjacent spring assemblies 4 engage with each other through snap-fit connections. Both ends of the spring assembly 4 are set with matching input shaft holes 411 and second output shafts 40. The second output shaft 40 is integrally formed at the end of the rotating spring shaft 43 away from the input shaft hole 411. Between adjacent spring assemblies 4, the second output shaft 40 of one spring assembly 4 is inserted into and rotates synchronously with the input shaft hole 411 of the other spring assembly 4, allowing for multiple sets of spring assemblies 4 to increase the recoil force of the curtain fabric, suitable for wide and large curtain fabric winding, with a wide range of applications. The number of spring assemblies 4 is determined based on parameters such as curtain size and weight, and the recoil force of the spring assemblies 4. The method for setting the coiled spring 42 is as follows: for small curtains, narrow/thin coiled springs 42 can be chosen; for large curtains, wide/thick coiled springs 42 can be chosen to increase the recoil torque. The number of spring assembly 4 sets is determined according to the matching of different coiled spring recoil forces with the required recoil forces of different curtains, allowing for more flexible use.

Embodiment 2

Figure 12:
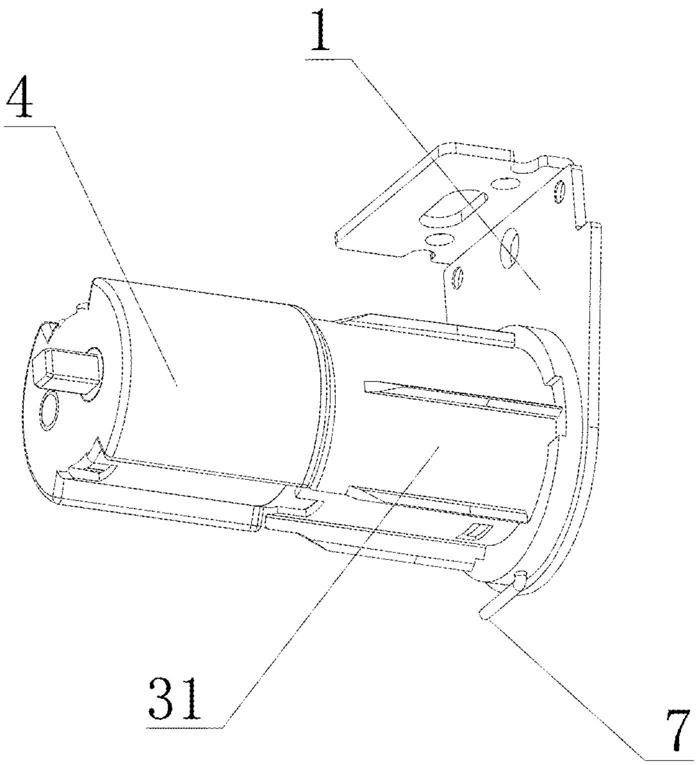
FIG. 12 is a perspective view of the second embodiment of this disclosure.
Figure 13:
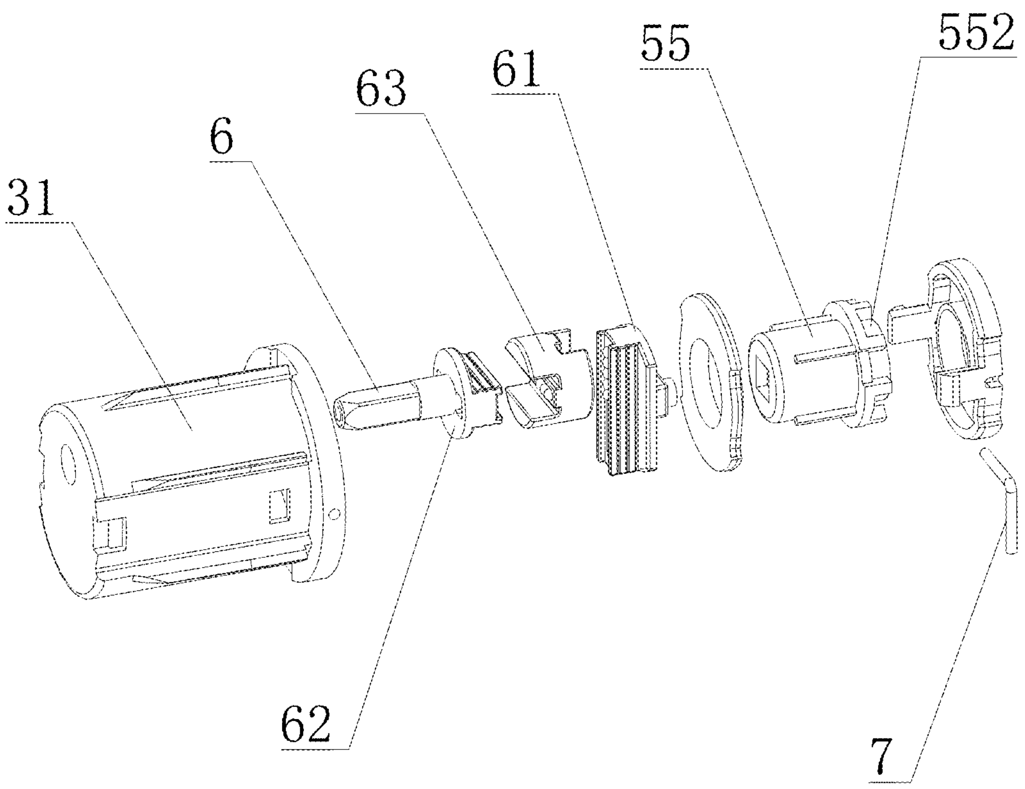
FIG. 13 is an exploded view of the rotating assembly part of the second embodiment of this disclosure.
Figure 14:
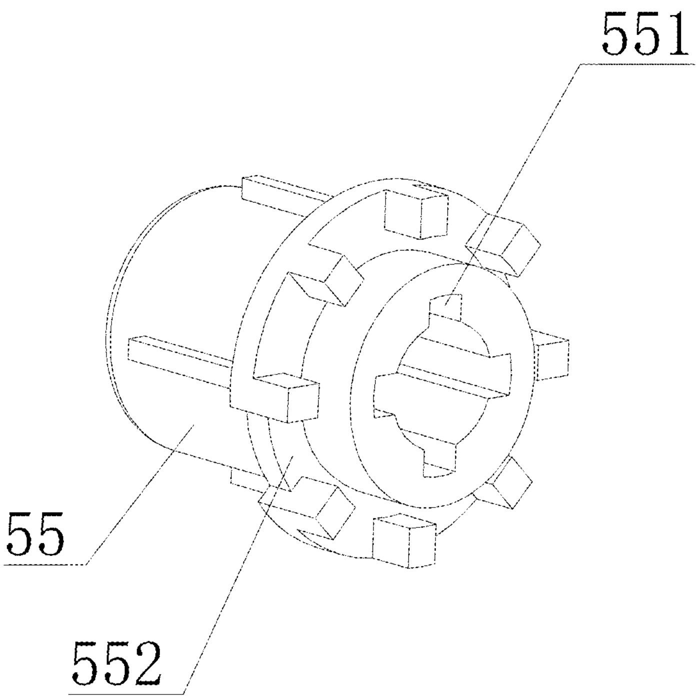
FIG. 14 is a structural diagram of the fixed shaft of the second embodiment of this disclosure.

Referring to FIGS. 12-14, the main difference between this Embodiment 2 and Embodiment 1 is: The fixed part 5 includes a fixed shaft 55, the first connecting block 61 is fixedly connected to one end of the fixed shaft 55, a first locking block 101 is set on the mounting bracket 1, a second locking groove 551 for engaging with the first locking block 101 is set on the side of the fixed shaft 55, a removable locking pin 7 is inserted into the outer shell body 31, multiple third locking grooves 552 corresponding to the locking pin 7 are set around the fixed shaft 55, and one end of the locking pin 7 passes through the outer shell body 31 and locks into one of the third locking grooves 552 for positioning, to limit the relative rotation between the fixed shaft 55 and the outer shell body 31. In this Embodiment 2, the winding device can be pre-tightened before leaving the factory, with this tightened force locked by the locking pin 7. Users or installers only need to remove the locking pin 7 to utilize this pre-tightened force during installation, eliminating the need for re-tightening and making installation more convenient.

This disclosure's self-stopping roller blind mechanism with spring integrated in roller shaft places the spring assembly inside the roller shaft, greatly reducing the thickness of the mounting bracket, narrowing the gap between the side surface of the mounting bracket and the curtain fabric, reducing light leakage, and simplifying the structure of the mounting bracket, thereby lowering production costs. The rotating part includes an outer shell body, which includes a plunger main body placed inside the roller shaft, resulting in a compact structure and hidden design within the roller shaft, avoiding increased gaps between the curtain fabric and mounting bracket. In the structure with a manual adjustment dial, users or installers can manually pre-tighten the spring assembly through the dial, with adjustable tightening levels, preventing waste of the spring assembly's winding capacity. In the structure with a locking pin, the spring assembly can be pre-tightened before leaving the factory, with this tightened force locked by the pin. Users or installers only need to remove the pin to utilize this pre-tightened force during installation, eliminating the need for re-tightening and making installation more convenient. The number of spring assemblies can be set according to the matching of different coiled spring recoil forces with the required recoil forces of different curtains, allowing for more flexible use.

This disclosure also provides a hand-held curtain that includes the aforementioned self-stopping roller blind mechanism with spring integrated in roller shaft. This hand-held curtain shares the same beneficial effects as the self-stopping roller blind mechanism with spring integrated in roller shaft mentioned above, which will not be repeated here.

The above description is only the preferred embodiment of this disclosure. It should be noted that for ordinary technicians in this field, without departing from the technical principles of this disclosure, several improvements and refinements can also be made, and these improvements and refinements should also be considered as falling within the protection scope of this disclosure.

The invention claimed is:

1. A self-stopping roller blind mechanism with spring integrated in roller shaft, comprising: a mounting bracket (1), a winding device, and a roller shaft (2) connected to the winding device, the roller shaft (2) is used to connect a curtain fabric, the winding device is used to wind the roller shaft (2), characterized in that the winding device includes a rotating assembly and a spring assembly (4), the rotating assembly includes a fixed part (5) connected to the mounting bracket (1) and a rotating part (3) that can rotate along its own circumference, the rotating part (3) rotates synchronously with the roller shaft (2), when the rotating part (3) rotates, the rotating part (3) has a first direction that raises the curtain fabric and a second direction that lowers the curtain fabric, the spring assembly (4) is connected to the rotating part (3) and rotates synchronously, the spring assembly (4) is placed inside the roller shaft (2); when the rotating part (3) rotates in the second direction, the spring assembly (4) stores potential energy; by releasing the stored potential energy of the spring assembly (4), it drives the spring assembly (4), the rotating part (3), and the roller shaft (2) to rotate and reset in the first direction, thus raising and winding up the curtain fabric;

wherein the rotating part (3) includes an outer shell body (31), the outer shell body (31) includes a plunger main body (311), the plunger main body (311) is placed inside the roller shaft (2);

wherein the fixed part (5) includes a fixed sleeve (51), a manual adjustment dial (52) and a fixed column (53), the manual adjustment dial (52) includes a disc body (521) and an annular column body (522), the fixed column (53) is placed inside the annular column body (522), a clamping spring (54) is set between the fixed column (53) and the annular column body (522), a first locking block (101) is set on the mounting bracket (1), a first locking groove (531) for engaging with the first locking block (101) is set on a side of the fixed column (53), the annular column body (522) is placed inside the fixed sleeve (51), a second locking block (511) is set inside the fixed sleeve (51), a notch (5221) corresponding to the second locking block (511) is set on the annular column body (522), the fixed sleeve (51), the annular column body (522), the clamping spring (54) and the fixed column (53) are all placed inside the outer shell body (31), the outer shell body (31) engages with the spring assembly (4).

2. A self-stopping roller blind mechanism with spring integrated in roller shaft, comprising: a mounting bracket (1), a winding device, and a roller shaft (2) connected to the winding device, the roller shaft (2) is used to connect a curtain fabric, the winding device is used to wind the roller shaft (2), characterized in that the winding device includes a rotating assembly and a spring assembly (4), the rotating assembly includes a fixed part (5) connected to the mounting bracket (1) and a rotating part (3) that can rotate along its own circumference, the rotating part (3) rotates synchronously with the roller shaft (2), when the rotating part (3) rotates, the rotating part (3) has a first direction that raises the curtain fabric and a second direction that lowers the curtain fabric, the spring assembly (4) is connected to the rotating part (3) and rotates synchronously, the spring assembly (4) is placed inside the roller shaft (2); when the rotating part (3) rotates in the second direction, the spring assembly (4) stores potential energy; by releasing the stored potential energy of the spring assembly (4), it drives the spring assembly (4), the rotating part (3), and the roller shaft (2) to rotate and reset in the first direction, thus raising and winding up the curtain fabric;

wherein the rotating part (3) includes an outer shell body (31), the outer shell body (31) includes a plunger main body (311), the plunger main body (311) is placed inside the roller shaft (2);

wherein the fixed part (5) includes a fixed shaft (55), a first locking block (101) is set on the mounting bracket (1), a second locking groove (551) for engaging with the first locking block (101) is set on a side of the fixed shaft (55), a removable locking pin (7) is inserted into the outer shell body (31), multiple third locking grooves (552) corresponding to the locking pin (7) are set around the fixed shaft (55), and one end of the locking pin (7) passes through the outer shell body (31) and locks into one of the third locking grooves (552) for positioning.

3. A self-stopping roller blind mechanism with spring integrated in roller shaft, comprising: a mounting bracket (1), a winding device, and a roller shaft (2) connected to the winding device, the roller shaft (2) is used to connect a curtain fabric, the winding device is used to wind the roller shaft (2), characterized in that the winding device includes a rotating assembly and a spring assembly (4), the rotating assembly includes a fixed part (5) connected to the mounting bracket (1) and a rotating part (3) that can rotate along its own circumference, the rotating part (3) rotates synchronously with the roller shaft (2), when the rotating part (3) rotates, the rotating part (3) has a first direction that raises the curtain fabric and a second direction that lowers the curtain fabric, the spring assembly (4) is connected to the rotating part (3) and rotates synchronously, the spring assembly (4) is placed inside the roller shaft (2); when the rotating part (3) rotates in the second direction, the spring assembly (4) stores potential energy; by releasing the stored potential energy of the spring assembly (4), it drives the spring assembly (4), the rotating part (3), and the roller shaft (2) to rotate and reset in the first direction, thus raising and winding up the curtain fabric;

wherein the rotating part (3) includes an outer shell body (31), the outer shell body (31) includes a plunger main body (311), the plunger main body (311) is placed inside the roller shaft (2);

wherein the rotating assembly also includes a first output shaft (6), the first output shaft (6) is eccentrically set on a side of the outer shell body (31) close to the spring assembly (4), the first output shaft (6) is used to connect and drive the spring assembly (4) to store energy, and the rotation of the rotating part (3) drives the first output shaft (6) to rotate.

4. The self-stopping roller blind mechanism with spring integrated in roller shaft according to claim 3, characterized in that a transmission component is set between the first output shaft (6) and the fixed part (5); when the rotating part (3) rotates relative to the fixed part (5), it drives the first output shaft (6) to rotate through the transmission component.

5. The self-stopping roller blind mechanism with spring integrated in roller shaft according to claim 4, characterized in that the transmission component includes a first connecting block (61), a second connecting block (62), and an intermediate movable block (63) set inside the outer shell body (31); the first connecting block (61) is connected to the fixed part (5), the second connecting block (62) is set at an end of the first output shaft (6) away from the spring assembly (4), and the intermediate movable block (63) is movably connected between the first connecting block (61) and the second connecting block (62); the first connecting block (61) has a first protrusion (611), the second connecting block (62) has a second protrusion (621), and the intermediate movable block (63) has a first sliding groove (631) that slides with the first protrusion (611) and a second sliding groove (632) that slides with the second protrusion (621); an extension direction of the first sliding groove (631) and the extension direction of the second sliding groove (632) are perpendicular to each other.

6. The self-stopping roller blind mechanism with spring integrated in roller shaft according to claim 5, characterized in that a first protruding strip (6311) is set in the first sliding groove (631), extending along the extension direction of the first sliding groove (631); the first protrusion (611) has a third sliding groove (6111) that slides and engages with the first protruding strip (6311), extending along the extension direction of the first protrusion (611); a second protruding strip (6321) is set in the second sliding groove (632), extending along the extension direction of the second sliding groove (632); the second protrusion (621) has a fourth sliding groove (6211) that slides and engages with the second protruding strip (6321), extending along the extension direction of the second protrusion (621).

7. The self-stopping roller blind mechanism with spring integrated in roller shaft according to claim 6, characterized in that a first ball (10) is set between the first protruding strip (6311) and the third sliding groove (6111), and a second ball (11) is set between the second protruding strip (6321) and the fourth sliding groove (6211).

8. The self-stopping roller blind mechanism with spring integrated in roller shaft according to claim 5, characterized in that a first rib (6112) is set on the first protrusion (611), which contacts an inner wall of the first sliding groove (631).

9. The self-stopping roller blind mechanism with spring integrated in roller shaft according to claim 8, characterized in that the first rib (6112) extends along the extension direction of the first protrusion (611), the first rib (6112) comprises multiple first ribs (6112), and the first ribs (6112) are symmetrically distributed on sides of the first protrusion (611).

10. The self-stopping roller blind mechanism with spring integrated in roller shaft according to claim 8, characterized in that the first rib (6112) is in the shape of an arched protrusion.

11. The self-stopping roller blind mechanism with spring integrated in roller shaft according to claim 5, characterized in that a second rib (6212) is set on the second protrusion (621), which contacts an inner wall of the second sliding groove (632).

12. The self-stopping roller blind mechanism with spring integrated in roller shaft according to claim 11, characterized in that the second rib (6212) extends along the extension direction of the second protrusion (621), the second rib (6212) comprises multiple second ribs (6212), and the second ribs (6212) are symmetrically distributed on sides of the second protrusion (621).

13. The self-stopping roller blind mechanism with spring integrated in roller shaft according to claim 11, characterized in that the second rib (6212) is in the shape of an arched protrusion.

14. The self-stopping roller blind mechanism with spring integrated in roller shaft according to claim 3, characterized in that the spring assembly (4) includes a shell (41), one end of the shell (41) has an input shaft hole (411) for storing energy in the spring assembly (4), the input shaft hole (411)

matches the first output shaft (6), the spring assembly (4) also includes a coiled spring (42) and a rotating spring shaft (43) set inside the shell (41), a coiled end of the coiled spring (42) is connected to the rotating spring shaft (43), and the input shaft hole (411) is set at one end of the rotating spring shaft (43).

15. The self-stopping roller blind mechanism with spring integrated in roller shaft according to claim 3, characterized in that the fixed part (5) includes a fixed sleeve (51), a manual adjustment dial (52) and a fixed column (53), the manual adjustment dial (52) includes a disc body (521) and an annular column body (522), the fixed column (53) is placed inside the annular column body (522), a clamping spring (54) is set between the fixed column (53) and the annular column body (522), a first locking block (101) is set on the mounting bracket (1), a first locking groove (531) for engaging with the first locking block (101) is set on a side of the fixed column (53), the annular column body (522) is placed inside the fixed sleeve (51), a second locking block (511) is set inside the fixed sleeve (51), a notch (5221) corresponding to the second locking block (511) is set on the annular column body (522), the fixed sleeve (51), the annular column body (522), the clamping spring (54) and the fixed column (53) are all placed inside the outer shell body (31), the outer shell body (31) engages with the spring assembly (4).

16. The self-stopping roller blind mechanism with spring integrated in roller shaft according to claim 3, characterized in that the fixed part (5) includes a fixed shaft (55), a first locking block (101) is set on the mounting bracket (1), a second locking groove (551) for engaging with the first locking block (101) is set on a side of the fixed shaft (55), a removable locking pin (7) is inserted into the outer shell body (31), multiple third locking grooves (552) corresponding to the locking pin (7) are set around the fixed shaft (55), and one end of the locking pin (7) passes through the outer shell body (31) and locks into one of the third locking grooves (552) for positioning.

17. The self-stopping roller blind mechanism with spring integrated in roller shaft according to claim 3, characterized in that the mounting bracket (1) is in the form of a plate-like body, the spring assembly (4) comprises at least two multiple spring assemblies (4), adjacent spring assemblies (4) engage with each other, both ends of the spring assembly (4) are set with matching input shaft holes (411) and second output shafts (40), between adjacent ones of the spring assemblies (4), the second output shaft (40) of one of the spring assemblies (4) is inserted into and rotates synchronously with the input shaft hole (411) of another of the spring assemblies (4).

18. A hand-held curtain, characterized in that it includes the self-stopping roller blind mechanism with spring integrated in roller shaft according to claim 3.

* * * * *